US012644758B2

(12) United States Patent
Blacken et al.

(10) Patent No.: US 12,644,758 B2
(45) Date of Patent: Jun. 2, 2026

(54) CABLE WIRE INSERTION VERIFICATION

(71) Applicant: The Boeing Company, Arlington, VA (US)

(72) Inventors: Lars Eric Blacken, Bothell, WA (US); Darren Michael Chan, Thousand Oaks, CA (US); Michael Cui, Woodland Hills, CA (US); Jeffrey Alan McCaskey, Everett, WA (US)

(73) Assignee: The Boeing Company, Arlington, VA (US)

( * ) Notice: Subject to any disclaimer, the term of this patent is extended or adjusted under 35 U.S.C. 154(b) by 24 days.

(21) Appl. No.: 18/610,878

(22) Filed: Mar. 20, 2024

(65) Prior Publication Data

US 2025/0297887 A1     Sep. 25, 2025

(51) Int. Cl.
G01H 1/00     (2006.01)
G08B 21/18     (2006.01)

(52) U.S. Cl.
CPC ............... G01H 1/00 (2013.01); G08B 21/18 (2013.01)

(58) Field of Classification Search
CPC ........ G01H 1/00; G08B 21/18; H01R 13/641; H01R 43/26; H01R 2201/20
See application file for complete search history.

(56) References Cited

U.S. PATENT DOCUMENTS

| | | | | |
|---|---|---|---|---|
| 4,947,546 | A * | 8/1990 | Bowling | ................. H01R 43/01 |
| | | | | 29/33 M |
| 10,288,410 | B2 * | 5/2019 | Hoffmann | .............. H01R 43/20 |
| 12,140,566 | B1 * | 11/2024 | Ouis | ................... G01N 29/2437 |
| 2005/0273188 | A1 * | 12/2005 | Barwicz | ................... H04R 3/00 |
| | | | | 700/94 |
| 2016/0163176 | A1 | 6/2016 | Benner et al. | |
| 2018/0123306 | A1 * | 5/2018 | Takano | .................. B25J 9/1623 |
| 2020/0403367 | A1 | 12/2020 | Faure et al. | |
| 2021/0271323 | A1 | 9/2021 | Szelest et al. | |
| 2023/0013100 | A1 * | 1/2023 | Jun | ..................... H04M 1/0274 |
| 2023/0077378 | A1 * | 3/2023 | Jiang | ................... H01R 13/641 |
| | | | | 439/489 |

FOREIGN PATENT DOCUMENTS

| | | | | |
|---|---|---|---|---|
| DE | 102015208676 | A1 * | 11/2016 | ........... H01R 13/641 |
| WO | 2022146260 | A1 | 7/2022 | |

OTHER PUBLICATIONS

European Patent Office, Extended European Search Report Issued in Application No. 25157608.8, Jul. 23, 2025, Germany, 9 pages.

* cited by examiner

*Primary Examiner* — Adnan Aziz

(74) *Attorney, Agent, or Firm* — Alleman Hall LLP

(57)     ABSTRACT

A method for cable wire insertion verification includes, at an insertion verification system, receiving a vibration signal from a vibration sensor. The vibration signal represents vibration caused by insertion of a cable wire into a cable cavity of a cable connector housing. The vibration signal is input to an insertion verification model trained to evaluate whether input vibration signals are consistent with correct cable wire insertion. The insertion verification model outputs an indication that the vibration signal is consistent with correct insertion of the cable wire into the cable cavity.

20 Claims, 9 Drawing Sheets

200

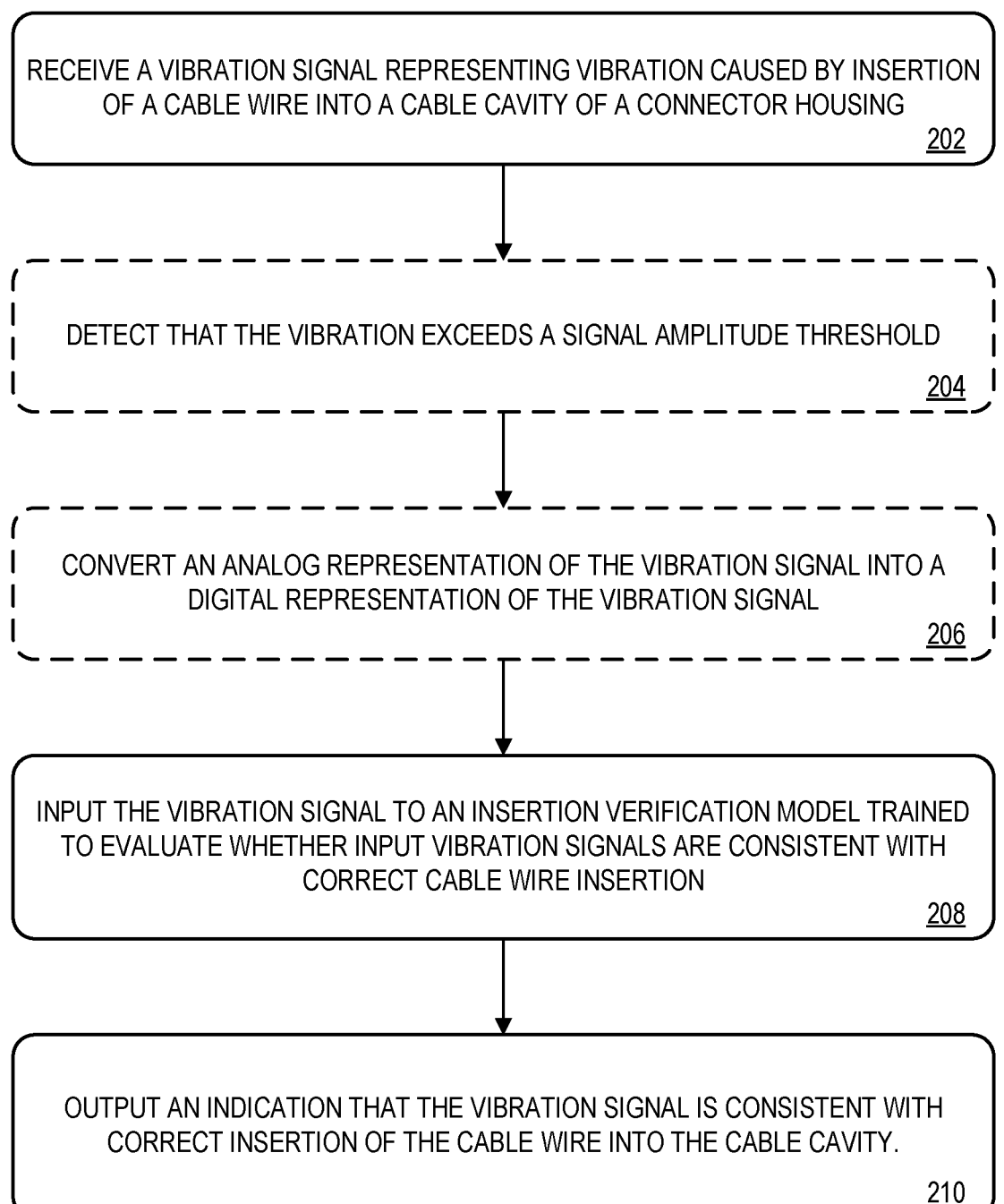

RECEIVE A VIBRATION SIGNAL REPRESENTING VIBRATION CAUSED BY INSERTION OF A CABLE WIRE INTO A CABLE CAVITY OF A CONNECTOR HOUSING

202

DETECT THAT THE VIBRATION EXCEEDS A SIGNAL AMPLITUDE THRESHOLD

204

CONVERT AN ANALOG REPRESENTATION OF THE VIBRATION SIGNAL INTO A DIGITAL REPRESENTATION OF THE VIBRATION SIGNAL

206

INPUT THE VIBRATION SIGNAL TO AN INSERTION VERIFICATION MODEL TRAINED TO EVALUATE WHETHER INPUT VIBRATION SIGNALS ARE CONSISTENT WITH CORRECT CABLE WIRE INSERTION

208

OUTPUT AN INDICATION THAT THE VIBRATION SIGNAL IS CONSISTENT WITH CORRECT INSERTION OF THE CABLE WIRE INTO THE CABLE CAVITY.

INSERTION VERIFICATION
SYSTEM 312

310

314

HF

316

318

INSERTION VERIFICATION SYSTEM 612

CABLE WIRE INSERTION VERIFICATION

FIELD

The invention relates generally to construction of cable connectors, and more particularly, to computer evaluation of vibration signals to verify correct cable wire insertion into a connector housing.

BACKGROUND

Various types of cable connectors are often used to conductively (or optically) couple one cable to another, and/or couple a cable to an electronic device, for transmission of data and/or power. In some examples, such cable connectors include one or more cable wires that are inserted into corresponding cable cavities of a connector housing. The size and shape of the connector housing, as well as the number and distribution of cable cavities included in the connector housing, can vary from one scenario to another depending on the purpose of the cable connector.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

A method for cable wire insertion verification includes, at an insertion verification system, receiving a vibration signal from a vibration sensor. The vibration signal represents a vibration caused by insertion of a cable wire into a cable cavity of a cable connector housing. The vibration signal is input to an insertion verification model trained to evaluate whether input vibration signals are consistent with correct cable wire insertion. The insertion verification model outputs an indication that the vibration signal is consistent with correct insertion of the cable wire into the cable cavity.

The features, functions, and advantages that have been discussed can be achieved independently in various embodiments or can be combined in yet other embodiments, further details of which can be seen with reference to the following description and drawings.

BRIEF DESCRIPTION OF THE DRAWINGS

FIG. 2 illustrates an example method for cable wire insertion verification.

DETAILED DESCRIPTION

Figure 1:
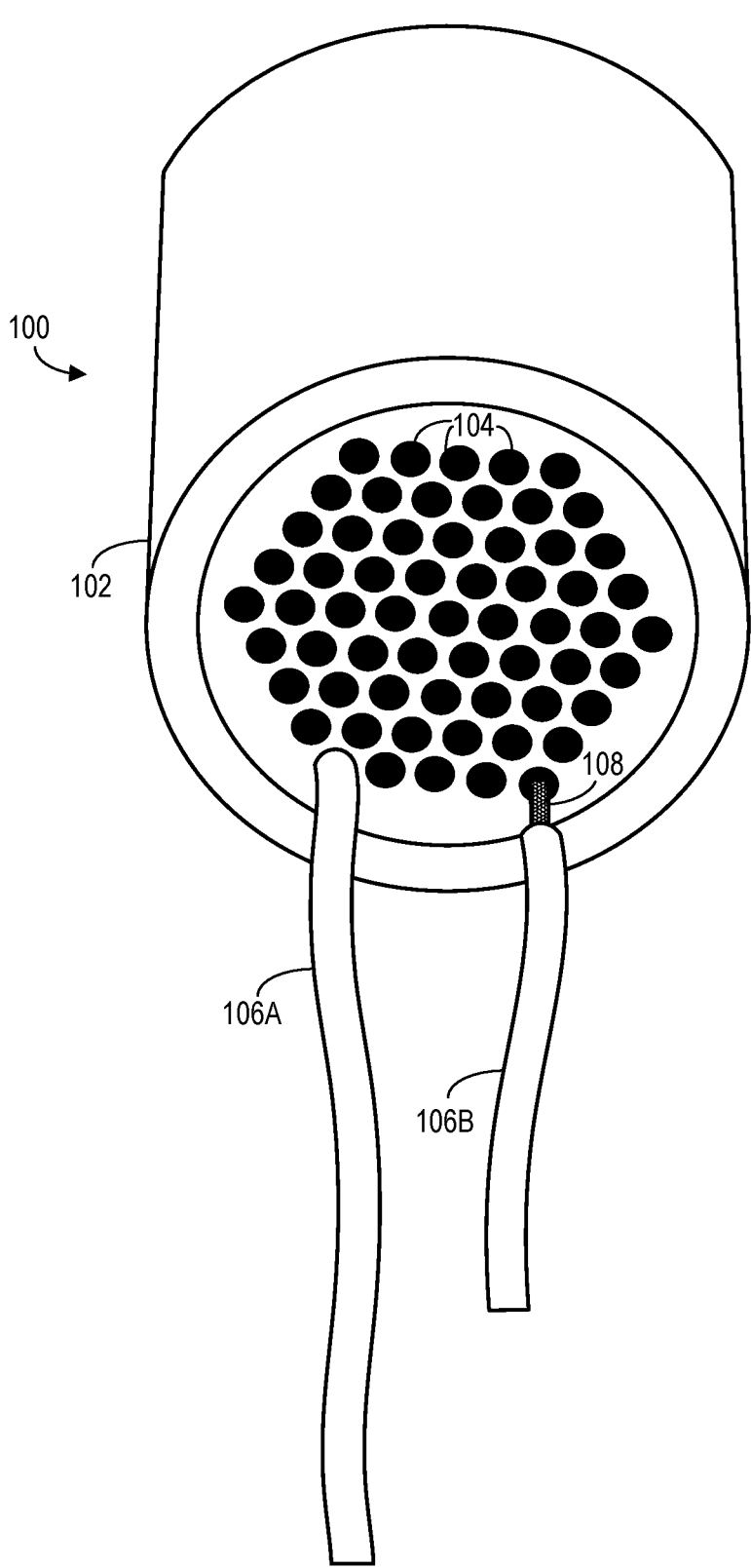
FIG. 1 schematically illustrates an example cable connector, including a cable connector housing and cable wires.

Construction of a cable connector typically involves one or more steps in which individual cable wires are inserted into cable cavities of a connector housing. Such insertion may be done manually, such as by a human worker, and/or automatically, such as via suitable mechanical or robotic insertion systems. In either case, however, cable wire insertion can be inconsistent and error prone. Furthermore, manual inspection of connector housings during manufacturing can be tedious and time-consuming and may not always detect cable insertion errors.

For instance, during the assembly process, cable wires typically must be fully inserted into the connector housing to securely retain the cable wire in place within the connector housing, and to provide a stable connection with any electronic components, other cable wires/connectors, etc. that the cable wire is connected to through the cable connector. However, due to the physical characteristics of the wires and the housing, as well as the variability associated with manual assembly, it can be difficult to consistently achieve full insertion. Furthermore, insufficient insertion may not be readily apparent, especially in cases where the cable wire is only marginally short of full insertion. This situation can lead to incomplete electrical (and/or optical) connections, potentially resulting in downstream errors or faults caused by intermittent signal transmission.

Accordingly, the present disclosure is directed to an insertion verification system used to monitor the insertion of cable wires into a cable connector housing, and automatically evaluate whether such cable wires are inserted correctly. This may include, for instance, determining whether the cable wire is inserted sufficiently far into a cable cavity (e.g., far enough to engage a retention mechanism), and/or determining whether a correct type of cable contact (e.g., shape, size) is inserted into the cable cavity. Upon detecting correct insertion, the system may output a correct insertion indication to a human worker and/or automated assembly system. For instance, the insertion verification system may illuminate an indicator light, play an audio alert, provide haptic feedback, output a computer-readable indication, etc., to confirm correct cable insertion.

Specifically, the techniques described herein use vibration analysis and machine learning to detect the proper insertion of cable wires into a cable connector housing. When a cable wire is inserted into the connector housing, interaction between the cable wire and cable cavity causes vibration. This vibration is captured by a vibration sensor and provided to an insertion verification model. The vibration sensor may be integrated into a cable insertion tool used for the insertion process, and/or a fixture that holds the connector housing in place, as examples. The captured vibration is transformed into an electrical vibration signal, which is subsequently analyzed by the insertion verification model. This model is trained based on a plurality of training examples (e.g., vibration signals labeled as corresponding either to a correct insertion or an incorrect insertion) to evaluate whether an input vibration signal provided during inference is consistent with correct cable insertion. Based on the output of the model, the system can provide an indication of correct cable wire insertion. In this manner, the present disclosure beneficially provides a precise and automated solution to verify correct insertion of cable wires, which reduces the risk of connection failures due to insufficient insertion and reduces human effort associated with manual insertion verification.

Cable wire insertion into a connector housing is schematically illustrated with respect to FIG. 1, showing an example cable connector 100. The cable connector includes a connector housing 102, which includes a plurality of cable cavities into which cables can be inserted during assembly of the cable connector. Several cable cavities are labeled in FIG. 1 as cable cavities 104. Additionally, FIG. 1 depicts two different cable wires 106A and 106B. Cable wire 106A has been fully inserted into the connector housing. However, cable wire 106B is not fully inserted into the connector housing. A portion of cable contact 108 attached to cable wire 106B is visible due to the incomplete insertion of the cable wire.

It will be understood that the specific components shown in FIG. 1, as well as the other FIGS. 2-7 described herein, are highly simplified for the sake of explanation. The sizes, shapes, and specific appearances of the components shown in FIGS. 1-7 are non-limiting and not drawn to scale. Furthermore, it will be understood that the components depicted in FIGS. 1-7 may be constructed from any suitable materials. For example, the connector housings, housing retainers, cable wires, cable contacts, and other components described herein may be constructed from any suitable combination of plastics and/or metals, as non-limiting examples.

In the example of FIG. 1, two different cable wires are shown, although it will be understood that any suitable number of different cable wires may be inserted into a connector housing. For instance, the number of inserted cable wires may be equal to, or less than, the number of cable cavities in the connector housing. In other words, it will be understood that the specific configuration depicted in FIG. 1 is non-limiting, and that the techniques described herein may be applicable to cable connectors used to connect any suitable number of cable wires to one another, and/or to electronic devices such as printed circuit boards (PCBs).

The present disclosure primarily focuses on electrically conductive cable wires used to transmit electrical power and/or data. However, in some examples, the cable connectors described herein may be used with cable wires that are not electrically conductive, but include other suitable transmissive media, such as fiber optic cables.

As used herein, a "cable wire" includes a length of material used for transmission of data and/or power (e.g., copper wire, fiber optic), often coated with a protective material (e.g., plastic or rubber insulation, grounded shielding). In other words, the term "cable wire" may be used to refer to more than just the conductive (e.g., copper) or non-conductive (e.g., fiber optic) core of the cable, but may additionally refer to any coating, insulation, and/or shielding applied to the core.

A "cable" includes one or more different cable wires. In cases where a cable only includes one cable wire, then the terms "cable wire" and "cable" may be used interchangeably. However, in some examples, one cable includes two or more cable wires bundled together. For instance, in some embodiments, a cable is a multi-conductor cable including two or more cable wires—e.g., different conductive copper wires are each coated in their own respective insulated cable jackets, and also bundled together in additional insulation and/or shielding to form a multi-conductor cable. In some embodiments, a cable is a shielded twisted pair cable, in which different cable wires include pairs of conductors twisted together and protected by an insulating jacket. The twisted pairs are themselves bundled together and enclosed by additional shielding and/or insulation to form the shielded twisted pair cable. In cases where a cable includes two or more different cable wires, the different cable wires may each be inserted into different cable cavities of the connector housing.

In general, there will be a correspondence between different specific cable wires and the cable cavities into which the cable wires are inserted. For instance, different specific cable wires may have different purposes (e.g., to carry power, to carry data, to complete a ground connection), and thus may be inserted into different specific cable cavities, such that the final cable connector can be used to couple the cable wires with the correct downstream components (e.g., ground points, input/output lines, power inlets). In some cases, the different cable wires have different distinguishable appearances—e.g., the cable wires may have different sizes (e.g., gauges), may use different colors or types of insulating/protective jackets, may use different materials for the cable wire core (e.g., different conductive metals or non-conductive materials), and/or may differ in any other suitable way.

In the example of FIG. 1, conductive cable contact 108 is attached to the tip of cable wire 106B. In general, however, tips of the cable wires may be treated in any suitable way. For instance, in some examples, conductive contacts may be attached to the cable wire tips, where such contacts may have any suitable size and shape. Different types of conductive contacts may in some cases be attached to different cable wires inserted into the same connector housing. In some examples, cable wires need not include conductive contacts. Rather, for instance, a cable wire may terminate with an exposed length of the cable wire core, or in any other suitable way.

Each cable cavity of the connector housing is sized and shaped for insertion of a cable wire. As shown, the cable wires 106A and 106B have been inserted into respective cable cavities of the connector housing. The cable cavities have any suitable size, based on the size of the cable intended for insertion into the cable cavities. In some examples, the same connector housing may include different cable cavity sizes intended for insertion of cable wires having different sizes (e.g., different wire gauges).

In some cases, the cable cavity is sized to accommodate the insulation jacket surrounding the core of the cable wire (e.g., the copper wire or fiber optic material), such that some length of insulated cable is inserted into the connector housing. In other examples, the insulation jacket may be trimmed such that only the cable core is inserted into the connector housing.

Any suitable length of cable wire may be inserted into the connector housing. In general, the cable wire is inserted sufficiently far into the connector housing so as to enable transmission of data and/or power between the cable wire and any components that are coupled with the connector housing—e.g., other cable wires and/or electronic devices. Additionally, or alternatively, cable wires may be inserted sufficiently far such that retention mechanisms within the connector housing hold the cable wires in place.

However, as discussed above, such insertion can in some cases be prone to insertion errors—e.g., cable wires not being inserted sufficiently far into their respective cable cavities, and/or being inserted into the incorrect cable cavities. Manual inspection and verification of cable wire insertion can be tedious and time-consuming. Accordingly, FIG. 2 illustrates an example method 200 for cable wire insertion verification. Steps of method 200 may be initiated, terminated, and/or repeated at any suitable time and in response to any suitable condition. Method 200 is primarily described as being performed by an insertion verification system, including a controller that executes software instructions to implement machine learning systems for vibration analysis. However, it will be understood that steps of method 200 may be performed by any suitable computing system of one or more computing devices, and any computing device implementing steps of method 200 may have any suitable capabilities, hardware configuration, and form factor. In some examples, method 200 is implemented by computing system 700 described below with respect to FIG. 7.

Figure 3:
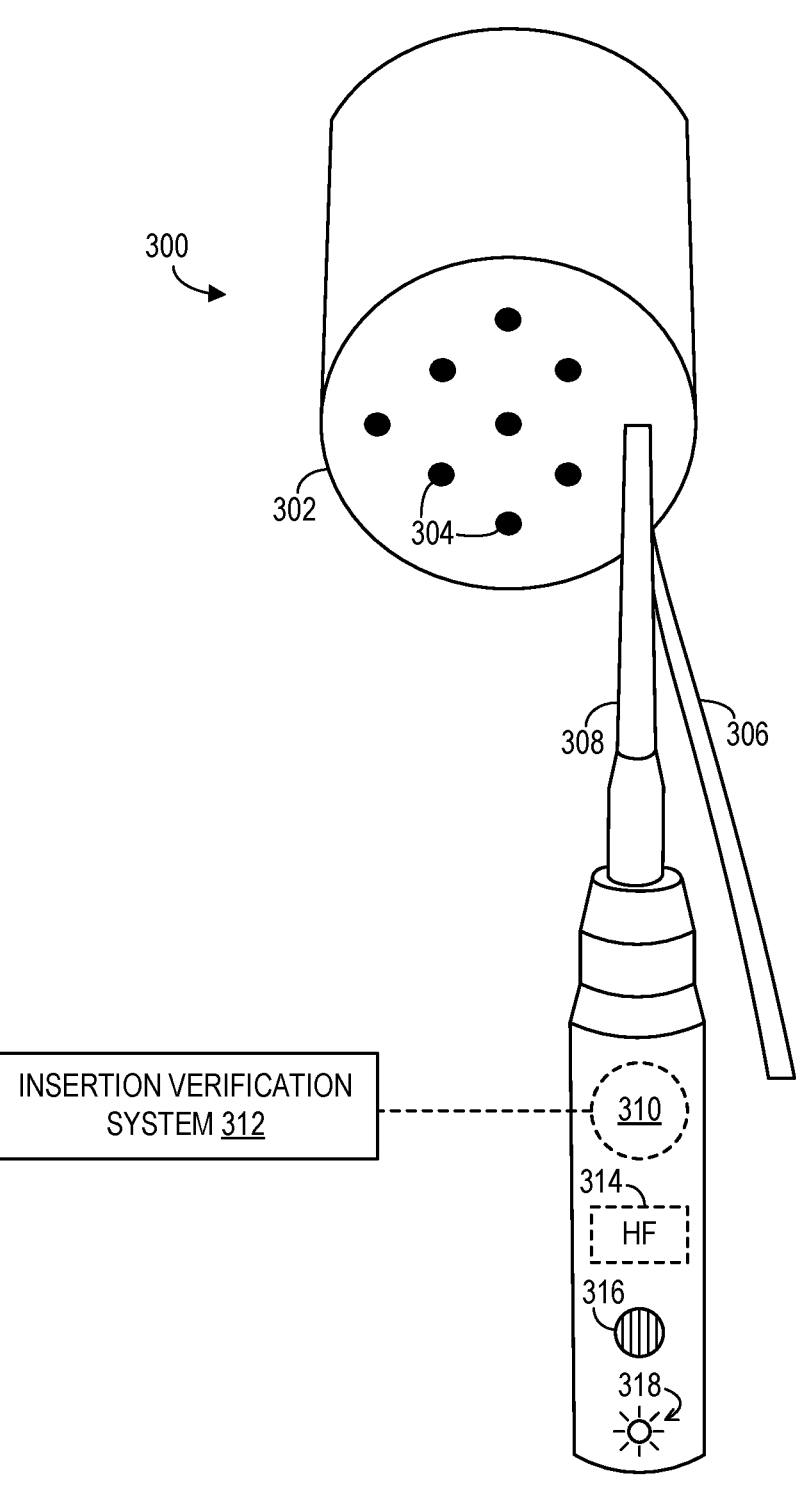
FIG. 3 schematically illustrates use of a cable insertion tool to insert a cable wire into a cable connector housing, the cable insertion tool including a vibration sensor.

At 202, method 200 includes, at an insertion verification system, receiving a vibration signal from a vibration sensor, the vibration signal representing vibration caused by insertion of a cable wire into a cable cavity of a cable connector housing. This is schematically illustrated with respect to FIGS. 3 and 4A-C. FIG. 3 schematically shows another example cable connector 300 being assembled. Cable connector 300 includes a connector housing 302, which itself includes a plurality of cable cavities 304. In this example, a cable wire 306 is in the process of being inserted into one of the cable cavities.

Notably, in this example, a cable insertion tool 308 is used during the insertion of cable wire 306 into connector housing 302. In one example scenario, a human worker may perform an initial insertion of the cable wire by hand—e.g., by pushing the cable contact and a length of cable wire into the connector housing. After this initial insertion, the human worker may use cable insertion tool 308 to push an additional length of cable wire into the connector housing, until the cable wire has been inserted sufficiently far to engage a retention mechanism within the connector housing (and/or fulfill any other suitable insertion conditions).

It will be understood that this scenario is non-limiting. For instance, in other examples, the entire insertion of the cable wire may be performed using the cable insertion tool (with no initial insertion by hand), or cable insertion may be performed without use of a cable insertion tool. For instance, as will be described in more detail below, the insertion detection techniques may in some cases be used in scenarios where a fixture holds the connector housing in place, and the vibration detection capabilities described herein are implemented at least partially through vibration sensors installed in the fixture. In some examples, vibration sensors may be included in a cable insertion tool in addition to a fixture used to hold the connector housing. In some examples, cable insertion may be performed by an automated system (e.g., cable insertion robot), without requiring a human worker to perform insertion.

In the example of FIG. 3, cable insertion tool 308 includes a vibration sensor 310. In other words, in this example, the vibration sensor is integrated into a cable insertion tool used to insert the cable wire into the cable cavity of the cable connector housing, such that the vibration propagates through a body of the cable insertion tool to reach the vibration sensor. The vibration sensor takes the form of any suitable computer hardware component usable to detect vibration caused by insertion of a cable wire into a cable cavity. For instance, the vibration sensor may take the form of any suitable device configured to convert mechanical vibrations into electrical signals. In some examples, the vibration sensor includes two or more different components each configured to detect vibration. As non-limiting examples, the vibration sensor may include a piezoelectric sensor (e.g., converting mechanical stress induced by vibrational motion into an electrical signal through the piezoelectric effect), an accelerometer (e.g., measuring the acceleration forces that cause a mass to displace from its neutral position and converting this movement into an electrical signal), and/or a microphone (converting sound waves into electrical signals through the movement of a diaphragm in response to air pressure changes). As one non-limiting example, an electret microphone may be used.

Although only one vibration sensor is shown in FIG. 3, it will be understood that this is non-limiting. Rather, a cable insertion tool used for cable wire insertion, a fixture used to hold a connector housing, and/or any other suitable structure involved in the cable connector assembly process, may include any suitable number and variety of different vibration sensors. In some cases, having a higher number and variety of vibration sensors (e.g., detecting vibration using multiple different modalities) may improve the sensitivity and accuracy of the insertion verification system.

In FIG. 3, the vibration sensor is communicatively coupled with an insertion verification system 312. The "insertion verification system" takes the form of any suitable computer logic hardware configured to execute software, firmware, and/or hardware-encoded instructions to thereby evaluate a vibration signal and verify correct cable wire insertion. In some examples, the insertion verification system is implemented as computing system 700 described below with respect to FIG. 7. As will be described in more detail below, the insertion verification system may be used to implement a machine learning insertion verification model. In cases where automated systems are used for insertion of cable wires into the connector housing, such automated systems may in some cases be controlled by, or otherwise communicatively coupled with, the insertion verification system.

In this example, the insertion verification system is depicted as being separate from the cable insertion tool. For instance, the cable insertion tool may be communicatively coupled with the insertion verification system using a suitable cable and/or wireless data communication channel. Additionally, or alternatively, aspects of the insertion verification system may be integrated into the same housing as the cable insertion tool.

Figure 4A:
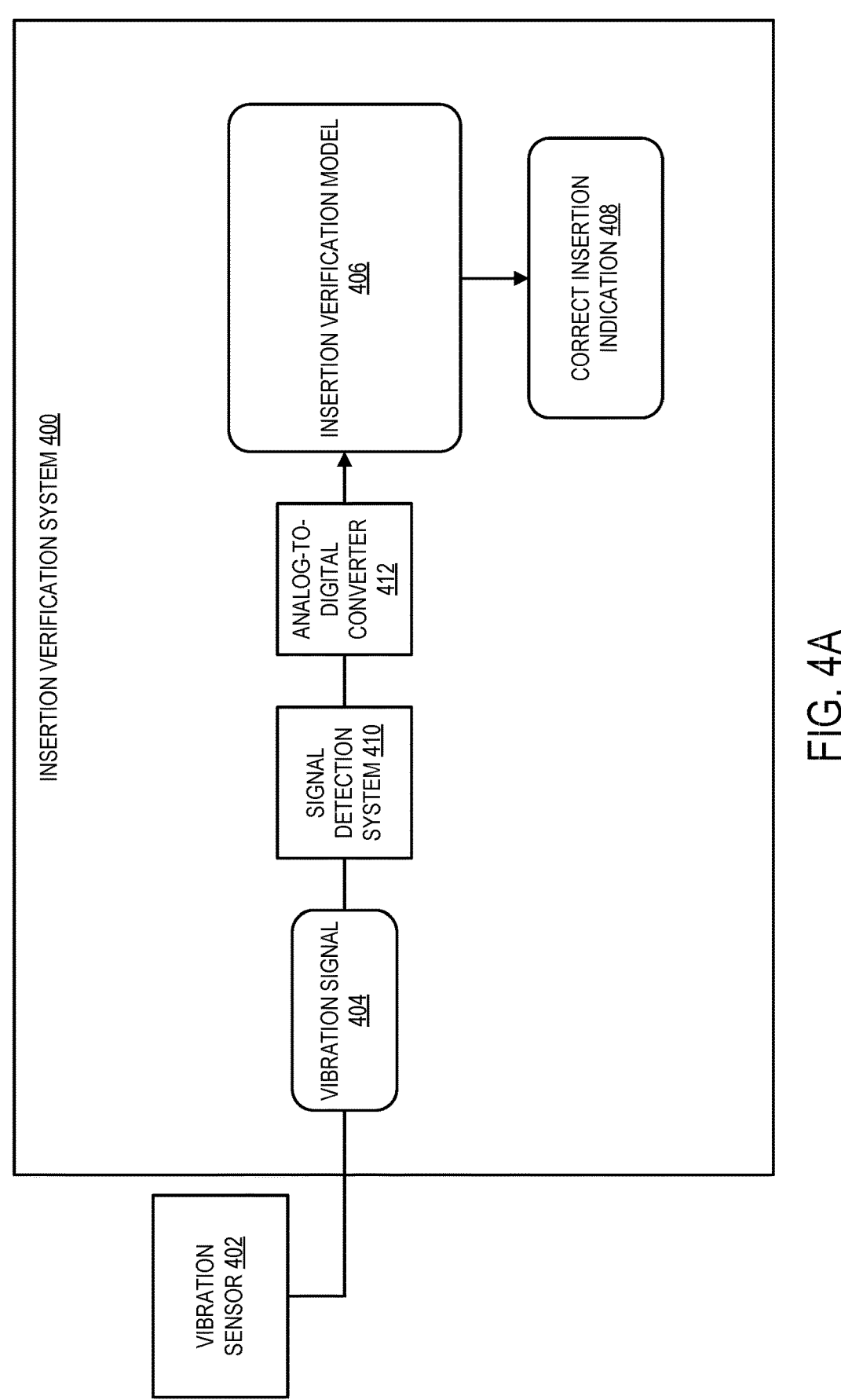
FIGS. 4A-4C schematically illustrate cable wire insertion verification based on a vibration signal.

In any case, during insertion of the cable wire into the cable cavity, contact between the cable wire and the cable cavity causes vibration that is detected at the vibration sensor. The vibration sensor then outputs a vibration signal to the insertion verification system. This is schematically illustrated with respect to FIG. 4A, showing an example insertion verification system 400 communicatively coupled with a vibration sensor 402. From the vibration sensor 402, insertion verification system 400 receives a vibration signal 404. As will be described in more detail below, the vibration signal is input into an insertion verification model 406, which then outputs an indication of correct cable wire insertion 408. In this example, the insertion verification system additionally includes a signal detection system 410 and an analog-to-digital converter (ADC) 412, which will be described in more detail below.

In some examples, the vibration signal may be received continuously while the vibration sensor and insertion verification are powered on. For example, as noises happen in the surrounding environment, people and/or machines move about the room, nearby assembling processes occur, etc., ambient vibration may be detected at the vibration sensor and reported to the insertion verification system. In some examples, it may not be desirable to continuously input such ambient vibration signals into the insertion verification model. For instance, this may unnecessarily consume computational resources of the insertion verification system.

As such, returning briefly to FIG. 2, at 204, method 200 optionally includes detecting that the vibration exceeds a signal amplitude threshold via a signal detection system of the insertion verification system. In FIG. 4A, the insertion verification system includes a signal detection system 410, which receives vibration signal 404. The signal detection system is implemented as any suitable combination of computer hardware, software, and/or firmware useable for evaluating the relative intensity of an input vibration signal.

As one non-limiting example, the signal detection system may include a signal processor. Furthermore, a signal processor may perform any suitable operations in addition to, or instead of, determining whether a vibration signal exceeds a signal amplitude threshold. For instance, in some examples, a signal processor may be used to filter frequencies from the vibration signal, amplify the vibration signal, reduce noise in the vibration signal, etc.

Figure 4B:
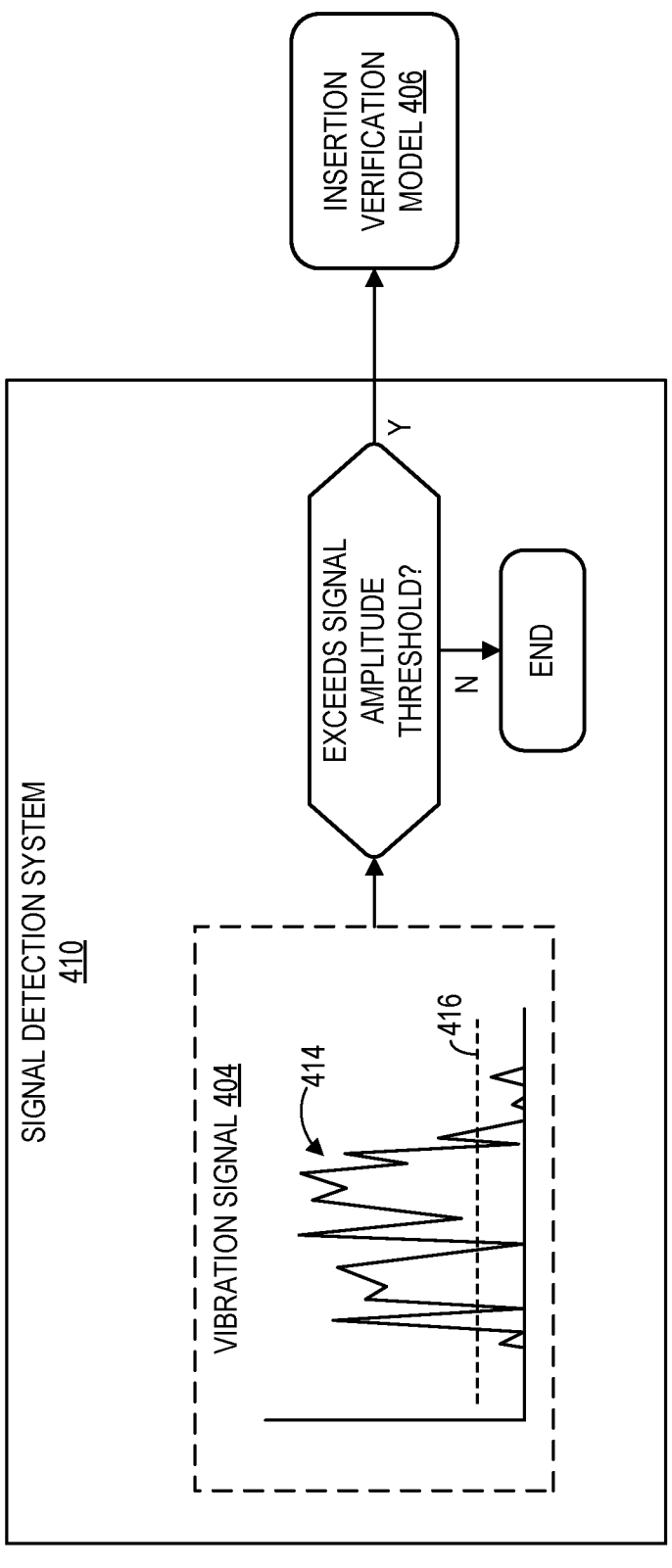

FIG. 4B schematically illustrates use of the signal detection system 410 in more detail. Specifically, FIG. 4B shows an analog representation 414 of vibration signal 404. The signal detection system evaluates whether the vibration signal exceeds a signal amplitude threshold 416. Upon determining that the vibration signal does exceed the signal amplitude threshold, the signal detection system outputs the vibration signal to the insertion verification model. Alternatively, if the vibration signal does not exceed the signal amplitude threshold, the signal detection system may refrain from outputting the vibration signal to the insertion verification model. In this manner, the insertion verification model is only used to evaluate vibration signals that exceed the signal amplitude threshold. This beneficially reduces expenditure of computational resources, as the insertion verification model is only used to evaluate vibration signals that are likely to correspond to insertion of a cable wire into a cable cavity during assembly of a cable connector.

In the example of FIG. 4B, the vibration signal is received at the insertion verification system as an analog representation of the underlying vibration. For instance, the vibration signal may be received as the direct output of a piezoelectric sensor, accelerometer, microphone, and/or other suitable type of vibration sensor. In such cases, the analog representation may be converted to a digital representation prior to inputting the vibration signal into the insertion verification model.

As such, returning briefly to FIG. 2, at 206, method 200 optionally includes, at 206, converting an analog representation of the vibration signal into a digital representation using an analog-to-digital converter (ADC) prior to inputting the vibration signal to the insertion verification model. In the example of FIG. 4A, the vibration signal is received at ADC 412, which converts the vibration signal into a digital representation prior to inputting the vibration signal to the insertion verification model.

Figure 4C:
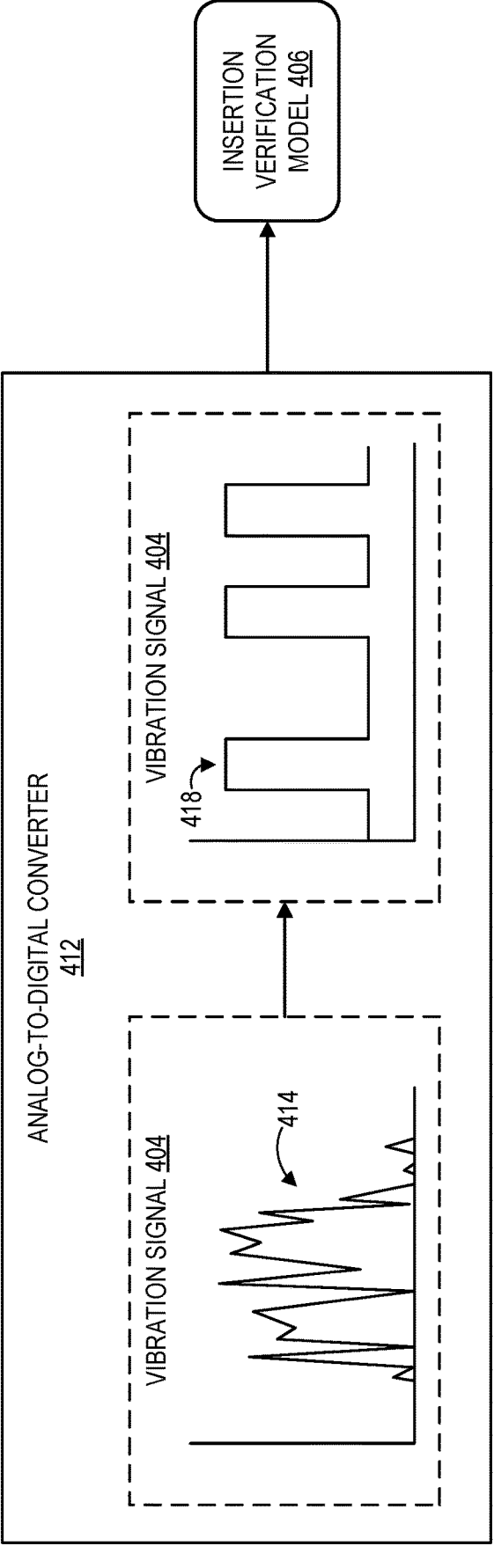

The operation of ADC 412 is schematically illustrated in more detail with respect to FIG. 4C. Specifically, FIG. 4C again shows an analog representation 414 of vibration signal 404. The ADC then converts the analog representation into a digital representation 418, where the underlying vibration is encoded through a stream of digital bits. This digital representation is then input to insertion verification model 406.

It will be understood that analog-to-digital conversion need not be performed by the insertion verification system. For instance, in some examples, the vibration signal may first be converted to a digital representation by the vibration sensor, or another suitable computer system, before the vibration signal is received at the insertion verification system. Thus, in some examples, the insertion verification system need not include an ADC as is shown in FIGS. 4A and 4C.

Returning briefly to FIG. 2, at 208, method 200 includes inputting the vibration signal to an insertion verification model. As discussed above, the insertion verification model is trained to evaluate whether input vibration signals are consistent with correct cable wire insertion. Such training is done based on a dataset including a plurality of training examples. This dataset may include examples of both correct and incorrect insertions, capturing a wide variety of insertion scenarios and conditions to ensure the model can generalize well (e.g., different insertion distances, speeds, amounts of insertion force used, type of cable contact used). Each training example may be labeled according to whether it corresponds to a correct or incorrect insertion.

The insertion verification model may take any suitable form, using any suitable machine learning (ML) and/or artificial intelligence (AI) techniques. As non-limiting examples, decision trees, support vector machines (SVM), neural networks, or deep learning models like convolutional neural networks (CNNs) may be suitable for implementing the insertion verification system.

In some examples, the insertion verification system may maintain multiple different insertion verification models. For instance, different models may be trained separately for different connector housings, different types of cable contacts, different types of insertion techniques (e.g., manual insertion by a human worker vs automated insertion via an assembly machine), etc. In some examples, the model used to evaluate a given vibration signal may be selected by a human worker (e.g., by specifying the type of cable connector being assembled), and/or determined automatically based on sensor data. In some examples, the same vibration signal may be provided to two or more different machine learning models, which may each output indications of whether that vibration signal is consistent with correct insertion according to that model's respective training.

Figures 5A, 5B, 5C:
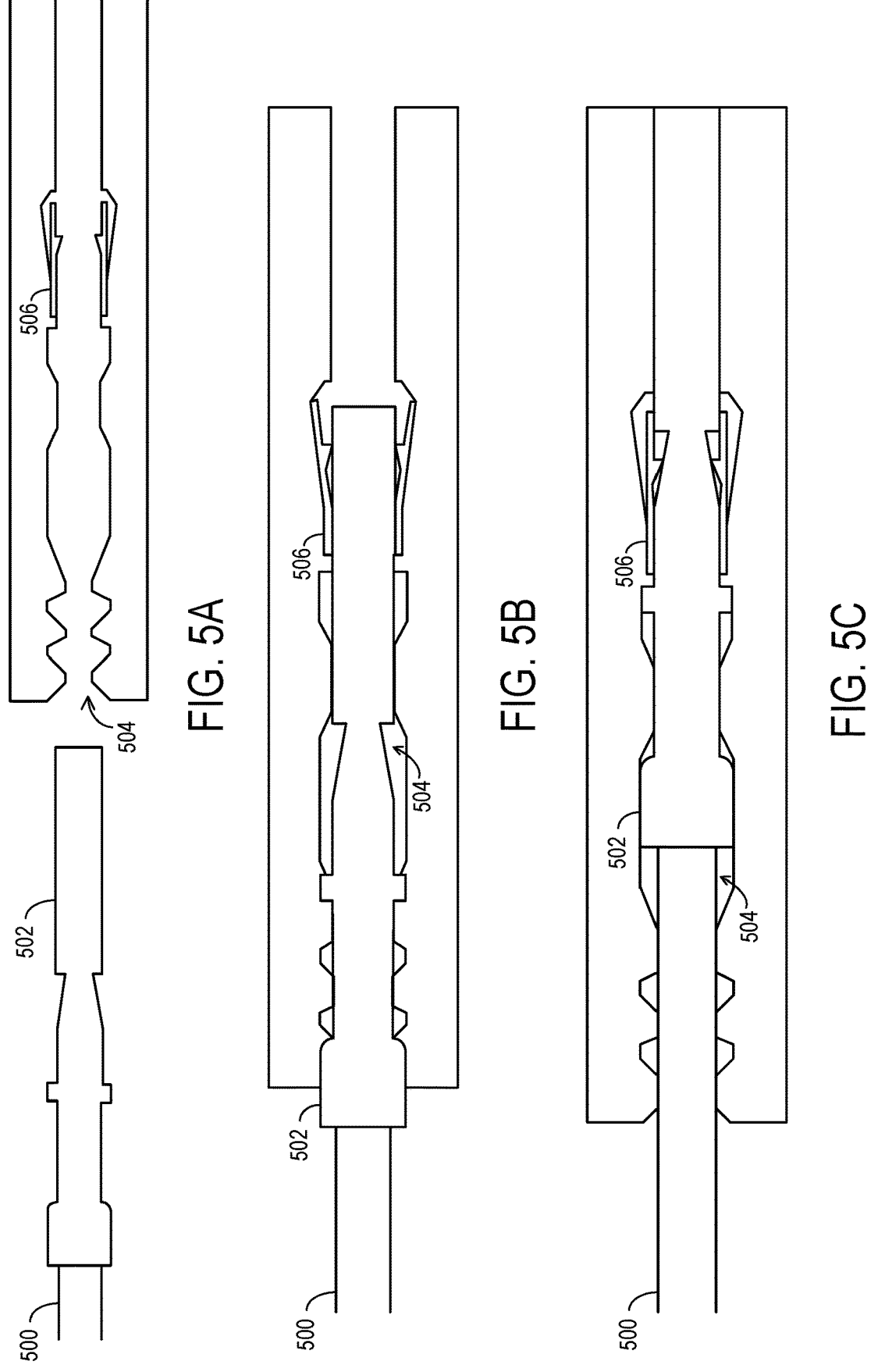
FIGS. 5A-5C schematically illustrate insertion of a cable wire into a cable cavity of a cable connector housing.

As discussed above, "correct" insertion of a cable wire may be determined according to any suitable criteria. In some examples, correct cable wire insertion may include insertion of the cable wire sufficiently far into the cable cavity to engage a retention mechanism that resists removal of the cable wire from the cable cavity. This is schematically illustrated with respect to FIGS. 5A-5C. Specifically, FIG. 5A schematically depicts an example cable wire 500, with a cable contact 502 attached to the tip of the cable wire. In FIG. 5A, the cable wire and cable contact are in the process of being inserted into a cable cavity 504, shown in cross section. It will be understood that cable cavity 504 may be one of a plurality of cable cavities of a connector housing—e.g., as is shown in FIGS. 1 and 3.

In FIG. 5A, the cable cavity includes a retention mechanism 506. In this example, the retention mechanism is implemented as a pair of clips that grip a portion of the cable contact once it is inserted sufficiently far into the cable cavity, thereby resisting retraction of the cable contact back out of the cable cavity. This is schematically illustrated in FIGS. 5B and 5C. In FIG. 5B, the cable wire has been partially inserted into the cable cavity. This has caused the retention clips to open and admit a portion of the cable contact. However, the cable contact has not yet been inserted sufficiently far to fully engage the retention mechanism. By contrast, in FIG. 5C, full insertion of the cable connector has been achieved. As shown, the geometry of the cable contact and cable cavity resists further insertion of the cable contact. Furthermore, the arrangement of the retention mechanism with respect to the cable connector resists removal of the cable contact from the cable cavity.

As this configuration is achieved, movement of the cable contact and retention mechanism may cause distinct vibration that is recognizable by the insertion verification system as corresponding to complete insertion of the cable wire into the cable cavity. This vibration may be distinct from other vibrations caused by insertion of the cable wire into the cable cavity. For instance, vibration occurring during the state depicted in FIG. 5B may be classified by the insertion verification system as not corresponding to correct insertion of the cable wire.

It will be understood that the specific scenario depicted in FIGS. 5A-5C is non-limiting. For instance, the specific geometry of the cable contact, the specific geometry of the cable cavity, and the manner in which the retention mechanism is implemented, may vary from one implementation to another. In general, the retention mechanism may use any suitable force to resist removal of the cable contact from the cable cavity—e.g., the retention mechanism may use friction, adhesion, suction, magnetism, etc.

Furthermore, additional or alternative criteria may be used to determine whether the cable wire is correctly inserted. For instance, in some examples, the type of cable contact (e.g., size, shape), the type of cable wire (e.g., width, material properties), the specific cable cavity into which the cable wire is inserted, the type of cable connector into which the cable contact is inserted, etc., may each influence the vibration signal detected at the vibration sensor. Thus, as another example, correct cable contact insertion may include a determination that the cable wire includes an intended cable contact type. This can, for instance, catch instances where a human worker attempts to insert the incorrect cable wire into a given cable cavity, if the cable wire has a different type of cable contact from what is expected.

Returning briefly to FIG. 2, at 210, method 200 includes outputting, from the insertion verification model, an indication that the vibration signal is consistent with correct insertion of the cable wire into the cable cavity. Such an indication may take any suitable form. As non-limiting examples, outputting a correct insertion indication may include any or all of illuminating an indicator light, playing an audio insertion confirmation, activating a haptic feedback system, displaying text on a computer display, outputting a data confirmation to an automated assembly system, and/or providing any other suitable type of correct insertion feedback.

Returning briefly to FIG. 3, in this example, the cable insertion tool 308 includes various feedback systems that may be used to provide an indication of correct insertion to a human worker. It will be understood that this scenario is non-limiting, and that any suitable combination of one or more suitable feedback systems may be used. Furthermore, such feedback systems may be integrated into any suitable devices or components in addition to, or instead of, the cable insertion tool.

Specifically, in FIG. 3, the cable insertion tool includes a haptic feedback system 314. Upon detecting correct insertion, the insertion verification system may activate the haptic feedback system to provide a confirmation to a human worker holding the cable insertion tool. Similarly, in this example, the cable insertion tool includes an audio speaker 316, which may be activated to play an audio insertion confirmation. Cable insertion tool 308 additionally includes an indicator light 318, which may be illuminated to indicate correct cable wire insertion.

The present disclosure has thus far primarily focused on scenarios where the cable wire is inserted correctly, and therefore the insertion verification system outputs an indication of correct insertion. However, it will be understood that the insertion verification system may additionally or alternatively output indications when a particular vibration signal is determined not to correspond to correct insertion of the cable wire. For instance, the indicator light may be illuminated with a different color, and/or a different indicator light may be illuminated; an audio error indication may be played instead of an audio insertion confirmation; the haptic feedback system may be activated to provide a haptic pattern indicating unsuccessful insertion; error text may be displayed on a screen; an error report may be output to an automated system, etc.

In some cases, an incorrect insertion indication may specify the manner in which the insertion was unsuccessful. For instance, an incorrect insertion indication may specify whether the cable wire was inserted by an insufficient distance, the wrong type of cable contact was inserted, the cable wire was inserted into the wrong cavity, and/or any other detectable failure condition. Such information may be specified in any suitable way—e.g., through any or all of the feedback systems described above.

The present disclosure has thus far primarily focused on scenarios where aspects of the insertion verification system are implemented in tandem with a cable insertion tool that is used to insert the cable wire into the connector housing—e.g., cable insertion tool 308. However, as discussed above, aspects of the insertion verification system may additionally or alternatively be implemented in tandem with a fixture used to hold the connector housing in place. In other words, according to the techniques described herein, vibration sensors may be integrated into an insertion tool, and/or integrated into the fixture, and either or both of these sensor systems can be used in any suitable combination. For example, an insertion tool including vibration sensors may be used without a fixture, a fixture with vibration sensors may be used without an insertion tool, an insertion tool and fixture may be used together while only one includes vibration sensors, or an insertion tool and fixture may be used together while both include vibration sensors.

Figure 6:
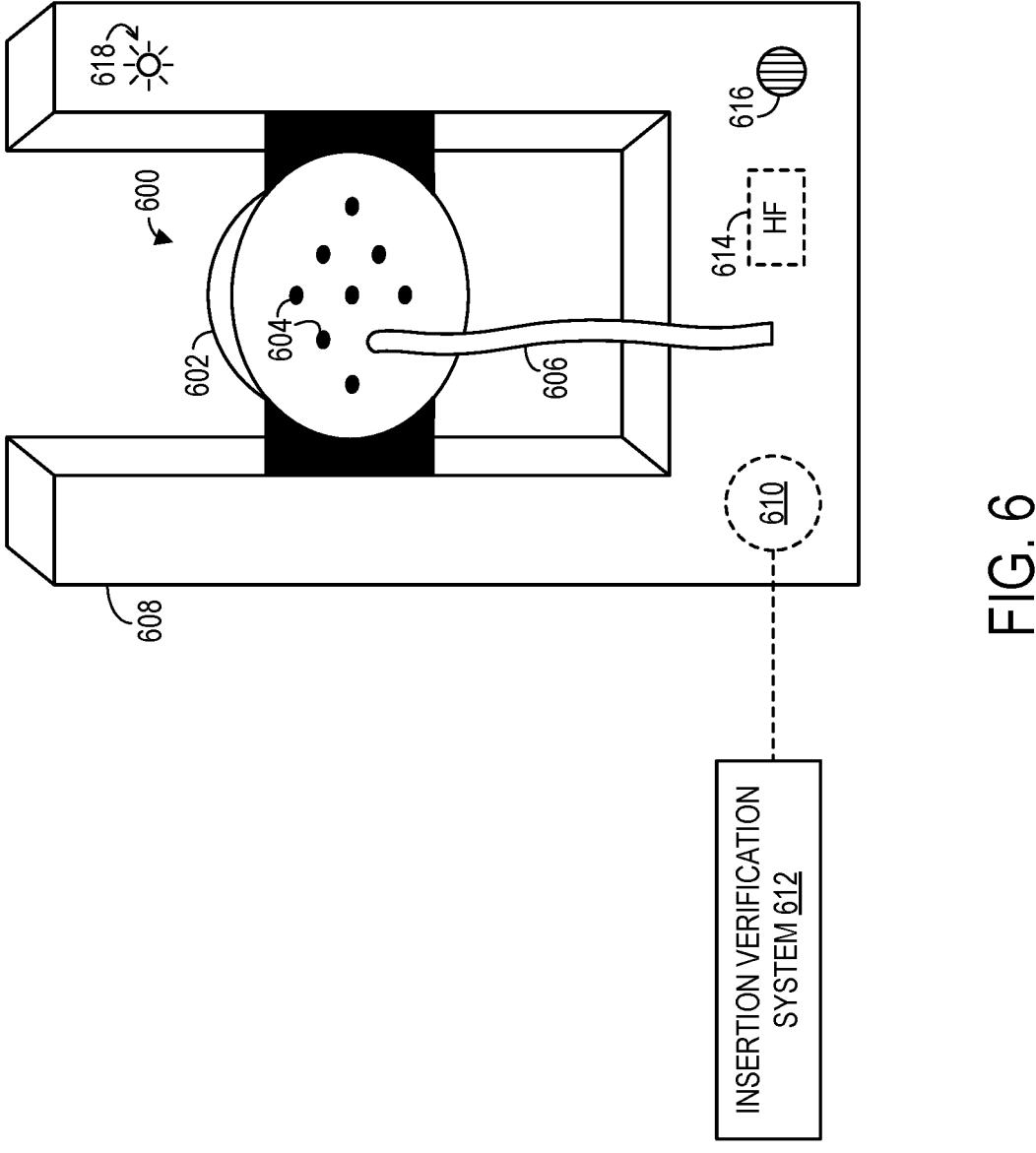
FIG. 6 schematically illustrates the use of a fixture to hold a cable connector housing in place, the fixture including a vibration sensor.

This is schematically illustrated with respect to FIG. 6. FIG. 6 schematically shows another example cable connector 600 being assembled. Cable connector 600 includes a connector housing 602, which itself includes a plurality of cable cavities 604. In this example, a cable wire 606 is in the process of being inserted into one of the cable cavities. Furthermore, in this example, the connector housing is held in place by a fixture 608. It will be understood that the specific design and appearance of fixture 608 in FIG. 6 is non-limiting, and in general, a "fixture" may take the form of any suitable structure usable for securely holding a connector housing in place while cable wires are inserted.

In this example, a vibration sensor 610 is integrated into fixture 608. In other words, in this example, the vibration sensor is integrated into a fixture that holds the cable connector housing in place, such that the vibration propagates through the body of the fixture to reach the vibration sensor. As with the example described above with respect to FIG. 3, the fixture may include any suitable number and variety of one or more different vibration sensors. Furthermore, such vibration sensors may have any suitable distribution within the fixture and/or other components involved in assembly of the cable connector. In this example, the vibration sensor is communicatively coupled with an insertion verification system 612, which is useable to evaluate whether vibration signals captured by the vibration sensor are consistent with correct cable wire insertion. Upon detecting correct insertion, the insertion verification system may activate one or more feedback systems as discussed above. For instance, in FIG. 6, the fixture includes a haptic feedback system 614, audio speaker 616, and indicator light 618.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
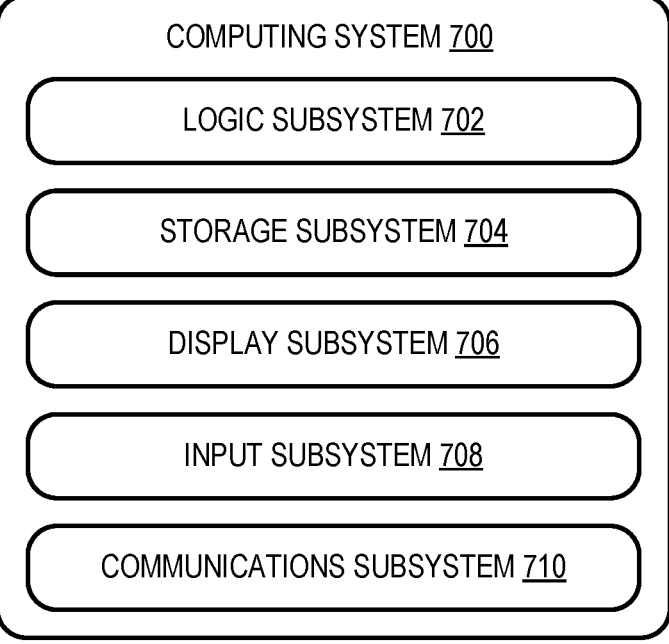
FIG. 7 schematically shows an example computing system.

FIG. 7 schematically shows a simplified representation of a computing system 700 configured to provide any to all of the compute functionality described herein. Computing system 700 may take the form of one or more network-accessible devices, personal computers, server computers, mobile computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information, such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for cable wire insertion verification comprises: at an insertion verification system, receiving a vibration signal from a vibration sensor, the vibration signal representing a vibration caused by insertion of a cable wire into a cable cavity of a cable connector housing; inputting the vibration signal to an insertion verification model, wherein the insertion verification model is trained to evaluate whether input vibration signals are consistent with correct cable wire insertion; and outputting, from the insertion verification model, an indication that the vibration signal is consistent with correct insertion of the cable wire into the cable cavity. In this example or any other example, the vibration signal is received from the vibration sensor as an analog representation of the vibration, and wherein the method further comprises converting the analog representation to a digital representation using an analog-to-digital converter (ADC) prior to inputting the vibration signal to the insertion verification model. In this example or any other example, the vibration sensor is integrated into a cable insertion tool used to insert the cable wire into the cable cavity of the cable connector housing, such that the vibration propagates through a body of the cable insertion tool to reach the vibration sensor. In this example or any other example, the vibration sensor is integrated into a fixture that holds the cable connector housing in place, such that the vibration propagates through a body of the fixture to reach the vibration sensor. In this example or any other example, correct cable wire insertion includes insertion of the cable wire sufficiently far into the cable cavity to engage a retention mechanism that resists removal of the cable wire from the cable cavity. In this example or any other example, correct cable wire insertion includes a determination that the cable wire includes an intended cable contact type. In this example or any other example, the method further comprises, prior to inputting the vibration signal to the insertion verification model, detecting that the vibration exceeds a signal amplitude threshold via a signal detection system of the insertion verification system. In this example or any other example, outputting the indication includes illuminating an indicator light. In this example or any other example, outputting the indication includes playing an audio insertion confirmation. In this example or any other example, outputting the indication includes activating a haptic feedback system. In this example or any other example, the vibration sensor includes a piezoelectric sensor. In this example or any other example, the vibration sensor includes an accelerometer. In this example or any other example, the vibration sensor includes a microphone.

In an example, an insertion verification system comprises: a logic subsystem; and a storage subsystem holding a set of instructions executable by the logic subsystem to: receive a vibration signal from a vibration sensor, the vibration signal representing a vibration caused by insertion of a cable wire into a cable cavity of a cable connector housing; input the vibration signal to an insertion verification model, wherein the insertion verification model is trained to evaluate whether input vibration signals are consistent with correct cable wire insertion; and output, from the insertion verification model, an indication that the vibration signal is consistent with correct insertion of the cable wire into the cable cavity. In this example or any other example, the vibration signal is received from the vibration sensor as an analog representation of the vibration, and wherein the set of instructions are further executable to convert the analog representation to a digital representation using an analog-to-digital converter (ADC) prior to inputting the vibration signal to the insertion verification model. In this example or any other example, the vibration sensor is integrated into a cable insertion tool used to insert the cable wire into the cable cavity of the cable connector housing, such that the vibration propagates through a body of the cable insertion tool to reach the vibration sensor. In this example or any other example, the vibration sensor is integrated into a fixture that holds the cable connector housing in place, such that the vibration propagates through a body of the fixture to reach the vibration sensor. In this example or any other example, the set of instructions are further executable to detect that the vibration exceeds a signal amplitude threshold via a signal detection system of the insertion verification system prior to inputting the vibration signal to the insertion verification model. In this example or any other example, outputting the indication includes one or more of illuminating an indicator light, playing an audio insertion confirmation, and activating a haptic feedback system.

In an example, a method for cable wire insertion verification comprises: at an insertion verification system, receiving a vibration signal from a vibration sensor, the vibration signal representing vibration caused by insertion of a cable wire into a cable cavity of a cable connector housing, wherein the vibration sensor is integrated into a cable insertion tool used to insert the cable wire into the cable cavity of the cable connector housing; inputting the vibration signal to an insertion verification model, wherein the insertion verification model is trained to evaluate whether input vibration signals are consistent with correct cable wire insertion; and outputting, from the insertion verification model, an indication that the vibration signal is consistent with insertion of the cable wire into the cable cavity sufficiently far to engage a retention mechanism that resists removal of the cable wire from the cable cavity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for cable wire insertion verification, the method comprising:
   at an insertion verification system, receiving a vibration signal from a vibration sensor, the vibration signal representing a vibration caused by insertion of a cable wire into a cable cavity of a cable connector housing;
   inputting the vibration signal to an insertion verification model to evaluate whether the vibration signal is consistent with correct insertion of the cable wire into the cable cavity, wherein the insertion verification model is trained to evaluate whether input vibration signals are consistent with correct cable wire insertion, wherein the insertion verification model is trained based on a dataset including a plurality of training examples that are varied with respect to a plurality of insertion parameters to represent examples of both correct insertions and incorrect insertions, and wherein the plurality of insertion parameters include one or more of insertion distance, insertion speed, insertion force, and cable contact type; and
   outputting, from the insertion verification model, an indication of whether that the vibration signal is consistent with correct insertion of the cable wire into the cable cavity.

2. The method of claim 1, wherein the vibration signal is received from the vibration sensor as an analog representation of the vibration, and wherein the method further comprises converting the analog representation to a digital representation using an analog-to-digital converter (ADC) prior to inputting the vibration signal to the insertion verification model.

3. The method of claim 1, wherein the vibration sensor is integrated into a cable insertion tool used to insert the cable wire into the cable cavity of the cable connector housing, such that the vibration propagates through a body of the cable insertion tool to reach the vibration sensor.

4. The method of claim 1, wherein the vibration sensor is integrated into a fixture that holds the cable connector housing in place, such that the vibration propagates through a body of the fixture to reach the vibration sensor.

5. The method of claim 1, wherein correct cable wire insertion includes insertion of the cable wire sufficiently far into the cable cavity to engage a retention mechanism that resists removal of the cable wire from the cable cavity.

6. The method of claim 1, wherein correct cable wire insertion includes a determination that the cable wire includes an intended cable contact type.

7. The method of claim 1, further comprising, prior to inputting the vibration signal to the insertion verification model, detecting that the vibration exceeds a signal amplitude threshold via a signal detection system of the insertion verification system.

8. The method of claim 1, wherein outputting the indication includes illuminating an indicator light.

9. The method of claim 1, wherein outputting the indication includes playing an audio insertion confirmation.

10. The method of claim 1, wherein outputting the indication includes activating a haptic feedback system.

11. The method of claim 1, wherein the vibration sensor includes a piezoelectric sensor.

12. The method of claim 1, wherein the vibration sensor includes an accelerometer.

13. The method of claim 1, wherein the vibration sensor includes a microphone.

14. An insertion verification system, comprising:

a logic subsystem; and a storage subsystem holding a set of instructions executable by the logic subsystem to:

receive a vibration signal from a vibration sensor, the vibration signal representing a vibration caused by insertion of a cable wire into a cable cavity of a cable connector housing;

input the vibration signal to an insertion verification model to evaluate whether the vibration signal is consistent with correct insertion of the cable wire into the cable cavity, wherein the insertion verification model is trained to evaluate whether input vibration signals are consistent with correct cable wire insertion, wherein the insertion verification model is trained based on a dataset including a plurality of training examples that are varied with respect to a plurality of insertion parameters to represent examples of both correct insertions and incorrect insertions, and wherein the plurality of insertion parameters include one or more of insertion distance, insertion speed, insertion force, and cable contact type; and output, from the insertion verification model, an indication of whether the vibration signal is consistent with correct insertion of the cable wire into the cable cavity.

15. The insertion verification system of claim 14, wherein the vibration signal is received from the vibration sensor as an analog representation of the vibration, and wherein the set of instructions are further executable to convert the analog representation to a digital representation using an analog-to-digital converter (ADC) prior to inputting the vibration signal to the insertion verification model.

16. The insertion verification system of claim 14, wherein the vibration sensor is integrated into a cable insertion tool used to insert the cable wire into the cable cavity of the cable connector housing, such that the vibration propagates through a body of the cable insertion tool to reach the vibration sensor.

17. The insertion verification system of claim 14, wherein the vibration sensor is integrated into a fixture that holds the cable connector housing in place, such that the vibration propagates through a body of the fixture to reach the vibration sensor.

18. The insertion verification system of claim 14, wherein the set of instructions are further executable to detect that the vibration exceeds a signal amplitude threshold via a signal detection system of the insertion verification system prior to inputting the vibration signal to the insertion verification model.

19. The insertion verification system of claim 14, wherein outputting the indication includes one or more of illuminating an indicator light, playing an audio insertion confirmation, and activating a haptic feedback system.

20. A method for cable wire insertion verification, the method comprising:

at an insertion verification system, receiving a vibration signal from a vibration sensor, the vibration signal representing vibration caused by insertion of a cable wire into a cable cavity of a cable connector housing, wherein the vibration sensor is integrated into a cable insertion tool used to insert the cable wire into the cable cavity of the cable connector housing;

inputting the vibration signal to an insertion verification model to evaluate whether the vibration signal is consistent with correct insertion of the cable wire into the cable cavity, wherein the insertion verification model is trained to evaluate whether input vibration signals are consistent with correct cable wire insertion, wherein the insertion verification model is trained based on a dataset including a plurality of training examples that are varied with respect to a plurality of insertion parameters to represent examples of both correct insertions and incorrect insertions, and wherein the plurality of insertion parameters include one or more of insertion distance, insertion speed, insertion force, and cable contact type; and outputting, from the insertion verification model, an indication that the vibration signal is consistent with insertion of the cable wire into the cable cavity sufficiently far to engage a retention mechanism that resists removal of the cable wire from the cable cavity.

* * * * *